United States Patent

[11] 3,584,893

[72] Inventors Franz Tuczek;
 Reinhard Alffen, both of Eitorf, Germany
[21] Appl. No. 811,379
[22] Filed Mar. 28, 1969
[45] Patented June 15, 1971
[73] Assignee Firma Boge G.m.b.H.
 Eitorf (Sieg), Germany
[32] Priority Mar. 28, 1968
[33] Germany
[31] P 17 55 087.7

[54] ELECTRONIC LEVEL REGULATORS FOR FLUID-TYPE SUSPENSIONS OF MOTOR VEHICLES AND THE LIKE
 15 Claims, 5 Drawing Figs.
[52] U.S. Cl. .................................................... 280/124, 267/65
[51] Int. Cl. ..................................................... B60g 17/00
[50] Field of Search............................................ 280/124 F, 6 H; 267/64, 65, 65 D; 307/9, 10, 119

[56] References Cited
 UNITED STATES PATENTS
| | | | |
|---|---|---|---|
| 3,021,151 | 2/1962 | Haddad........................ | 280/124 |
| 3,264,008 | 8/1966 | Allinquant.................... | 280/124 |

FOREIGN PATENTS
| | | | |
|---|---|---|---|
| 1,159,282 | 12/1963 | Germany...................... | 280/124 |

*Primary Examiner*—Philip Goodman
*Attorney*—McGlew and Toren

ABSTRACT: An electronic regulating device for fluid-type suspensions for motor vehicles, whose level is maintained substantially constant by the regulating device, includes a regulating switch having an "up" regulating contact surface which is grounded, a "down" regulating contact surface connected to the ungrounded terminal of a source of DC potential and a "neutral" contact surface between the "up" and "down" contact surfaces. The switch includes a contact arm which is movable over the surfaces in accordance with the distance between the vehicle body and the vehicle axle. A condenser has one terminal connected to the grounded terminal of the source, and charging resistance means connect the other terminal of the condenser to the switch arm. First and second control amplifiers are connected to the condenser, and one is operable to initiate feeding of the fluid and the other is operable to initiate draining of the fluid relative to the suspension system. One control amplifier is activated by condenser voltages below a lower limiting voltage, and the other control amplifier is activated by condenser voltages above an upper limiting voltage, both related to the potential source. Both control amplifiers are deactivated at condenser voltages between the upper and lower limiting voltages. The "neutral" contact surface may be made of dielectric material or may be a conductive surface at a small potential above ground. The control amplifiers may comprise Schmitt trigger devices.

INVENTORS
FRANZ TUCZEK
REINHARD ALFFEN

BY McGlew and Toren
ATTORNEYS

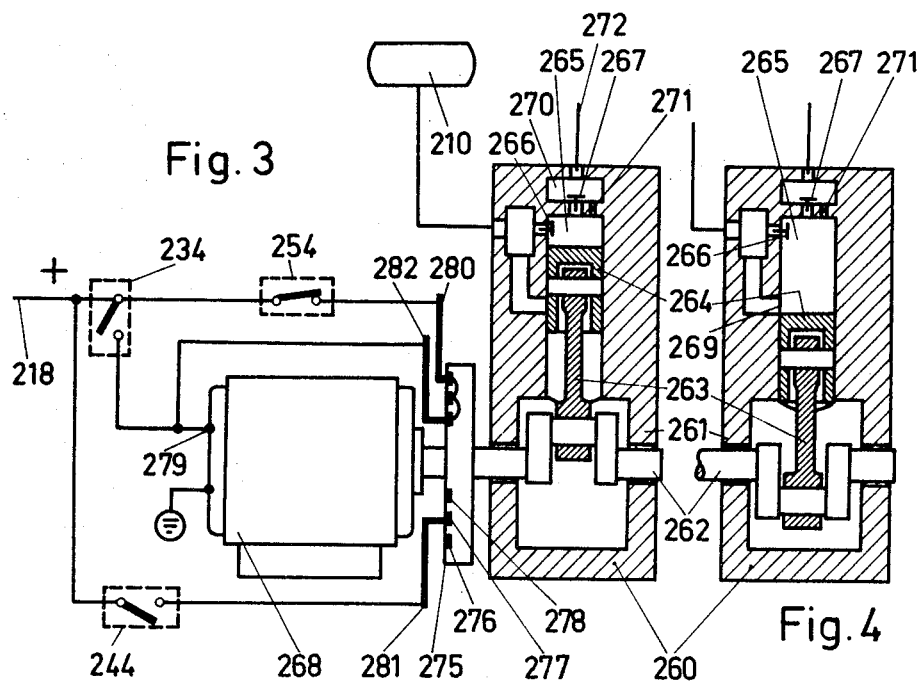
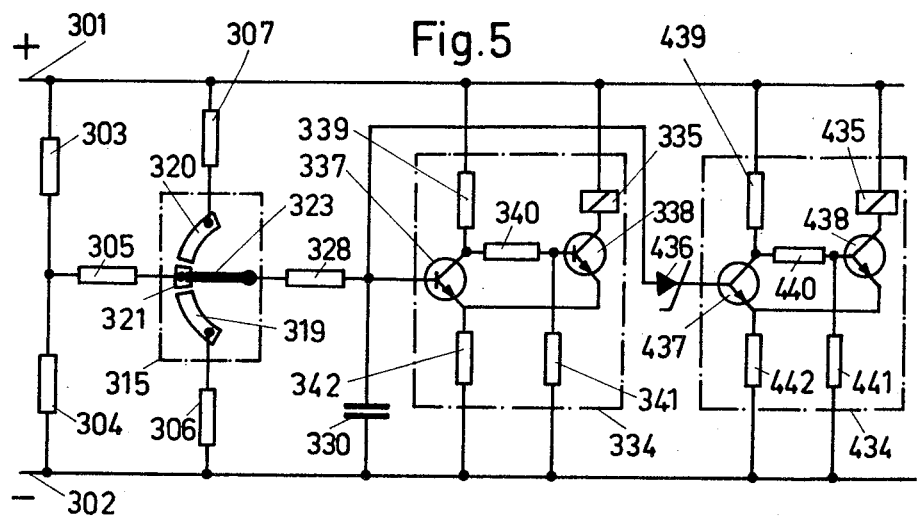

ELECTRONIC LEVEL REGULATORS FOR FLUID-TYPE SUSPENSIONS OF MOTOR VEHICLES AND THE LIKE

BACKGROUND OF THE INVENTION

German Auslegeschrift No. 1,255,514 discloses a level regulator for air suspensions which regulator includes at least one reversing switch controlled in accordance with the distance between the vehicle chassis and the vehicle axis. This switch controls the magnetic windings of inlet and outlet valves arranged in the inlet and outlet lines of air springs, and an electronic retarding device is arranged in the circuit of each magnetic winding, each retarding device including a transistor and a condenser with associated charging resistances connected to the transistor and the condenser. Each transistor is connected in series with a respective one of the magnetic windings of the inlet and outlet valves, as by having its emitter connected to one terminal of a source of operating potential and its base connected through a base resistance with a respective one of a pair of contacts of the reversing switch, which contacts are connected to the other terminal of the potential source. The transistors are connected through the condenser which influences the time delay period, and each of the contacts is connected, through a further resistance, to the emitters of the respective transistors.

In this known regulator, independent retarding devices are provided for each control zone, and two independent condensers, with a corresponding plurality of parts are required, which is a substantial disadvantage. An object of the present invention is to use a common condenser for all control zones, thereby to simplify the regulating device.

SUMMARY OF THE INVENTION

This invention relates to electronic level regulators for fluid-type suspensions of motor vehicles and the like and, more particularly, to an improved and simplified electronic level regulator for this purpose.

In accordance with the invention, the regulating device includes a condenser having one terminal connected with the grounded terminal of a source of DC operating potential, the other terminal of the condenser being connected, through charging resistances, to the movable arm of the regulating switch. This movable arm is engageable, in the up-regulating zone of the switch, with a contact surface connected to the grounded terminal of the source, with a dielectric contact surface in the neutral control zone and, in the down-regulating zone, with a contact surface connected to the ungrounded terminal of the source of operating potential. A control amplifier is activated to initate feeding of fluid to the suspension system, at condenser voltages which are below a lower limiting voltage close to the ground potential, and a control amplifier initiating draining of fluid from the suspension system is activated at condenser voltages which are above an upper limiting voltage close to the ungrounded potential of the operating current source. Both control amplifiers are disconnected at condenser voltages between the lower and upper limiting voltages. The control amplifiers can be either conductive or nonconductive in the activated state, and inversely either nonconductive or conductive in the deactivated state, in dependence on the requirements of the means executing the control signals. It will be assumed hereinafter that an activated and conductive control amplifier initiates execution of the control signals, and that a deactivated or nonconductive control amplifier interrupts execution of the control signals.

Advantageously, the invention regulating device requires only one condenser having a double function. The condenser functions, on one hand, as a delay device and, on the other hand, as a device whose charging state determines execution of the control signals. If the operating voltage is 12 volts, for example, the lower limiting voltage 2 volts and the upper limiting voltage 10 volts, one control amplifier is activated at a condenser voltage lower than 2 volts and is deactivated at a condenser voltage above 2 volts. The other control amplifier is activated at a condenser voltage of 10 volts or greater, and is deactivated at a condenser voltage under 10 volts. At condenser voltage between the upper and lower limiting voltage, or between 2 volts and 10 volts, both control amplifiers are deactivated. If neither feeding nor draining of the fluid relative to the suspension is effected, the regulating device is in the neutral zone.

If, during dynamic movements of the vehicle axis, the condenser is connected alternately with ground and with the positive potential, such as in the example with the positive potential being 12 volts, an integrated condenser voltage between zero and the maximum voltage can be established, so that the regulating device is and remains in its neutral zone. This integrated condenser voltage can be 6 volts, for example, where the potential of the DC source is 12 volts. With a static or quasi-static variation of the distance between the vehicle chassis and the axle, the regulating switch is connected primarily either with ground or with the positive potential, so that the integrated condenser voltage drops or rises. After the lower limiting voltage or the upper limiting voltage has been reached in the time required for changing the charge, for example, a few seconds, the respective control amplifier is activated to activate either the fluid feed or the fluid drain, as the control condition may require, and adjustment of the distance is effected in a known manner.

If the condenser voltage with a regulating switch which has a dielectric neutral zone can be charged or discharged very slowly by leakage currents, or if the voltage is unstable with the car standing still, an undesired regulating process could take place. In such case, it is advisable to connect the movable arm of the regulating switch, when this arm is in the neutral zone, to a partial voltage, for example half the operating voltage. This assures that the condenser voltages in the neutral zone are between the lower and upper limiting voltages, and no regulating process occurs.

The regulating device can also be connected in an inverse manner, so that the lower limiting voltage is determinant for draining of the fluid and the upper limiting voltage is determinant for feeding of the fluid. In general, however, the arrangement first described is preferred if, with the vehicle standing still, the regulating device is dead or inactive, so that the regulating process "feed fluid" can be initiated immediately at the start, due to the condenser voltage being zero, and the body, which has been lowered by the load which is the normal case at the starting of a vehicle, is lifted to be level.

The means actuated by the control amplifier for feeding fluid can be designed, for example, as magnetic valves arranged in the output line of a fluid pressure generator, these valves allowing flow of fluid when the amplifier is activated and blocking flow fluid when the amplifier is deactivated. The means actuated by the control amplifier for draining fluid can be designed, for example, as magnetic valves arranged in a return line and which, in the same manner, either provide for flow of fluid to the drain or reservoir or block such flow of fluid.

The fluid feeding means can also be pumps provided with nonreturn valves, and which pumps are activated responsive to activation of the control amplifiers and deactivated responsive to deactivation of the control amplifiers. The draining means could be the piston of a piston pump, and which piston stops in a certain position with the control amplifier deactivated. The piston itself, or a control piston actuated thereby, when in this position, opens a control port between fluid chambers of the fluid suspension, on the one hand, and the fluid storage tank, on the other hand. With the control amplifier activated, the pump piston can stop in a different position in which such control port is covered. Such a regulation has been suggested, for example, in German Pat. application B 9622,63c/II.

If, in the neutral zone, the regulating switch is connected with a divided operating voltage, the intermediate condenser voltage range thereby produced, can serve as information for another control signal given to an additional control amplifier.

The delay periods for executing and cancellation of the control signals "oil feeding" and "oil draining" can be made different from each other by suitable means, for example, by the use of different charging resistances. The lower and upper limiting values of the condenser voltages need not be the same for the execution and cancellation of the control signals, but preferably can be somewhat different. For example, the lower limiting voltage for executing the control signal "oil feeding" can be 1 volt, that for cancelling the control signal "oil feeding" can be 2 volts, that for executing the control signal "oil draining" can be 10.5 volts, and that for cancelling the control signal "oil draining" can be 9.5 volts.

As a control or switching amplifier, it is particularly suitable to use a circuit designed in the manner of a Schmitt trigger, consisting of two transistors, as known from the prior art, and whose output signal can assume only two different values depending on whether the input voltage either exceeds or is less than a certain value.

For an understanding of the principles of the invention, reference is made to the following description of typical embodiments thereof as illustrated in the accompanying drawings.

BRIEF DESCRIPTION OF THE DRAWINGS

IN THE Drawings:

FIG. 3 is a part section and part schematic view of a piston pump coupled with a DC motor in a connectable and disconnectable manner.

FIG. 4 is a sectional view illustrating the piston pump of FIG. 3 in an inner dead center position opening a control port; and FIG. 5 is a schematic wiring diagram of a regulating device embodying the invention and using Schmitt triggers as control amplifiers.

DETAILED DESCRIPTION OF THE PREFERRED EMBODIMENTS

Figure 1:
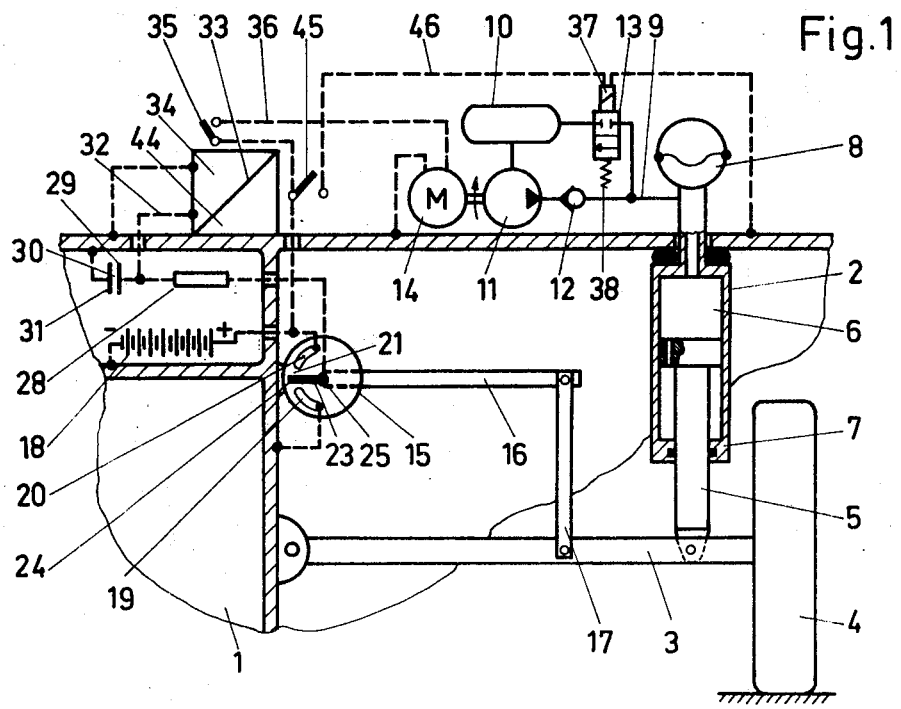
FIG. 1 is a schematic representation of a hydropneumatic suspension with a regulating switch arrangement embodying the invention, the switch having a dielectric neutral control range.

Referring first to FIG. 1, the weight of the body or chassis 1 of a vehicle is carried, either completely or proportionately, by a spring element 2 bearing elastically on the vehicle axis 3 having a wheel 4. Spring element 2 comprises a working piston 5 connected to axle 3 and an oil-filled working cylinder 6 secured to body 1, this cylinder having a cover 7 through which the piston rod of piston 5 extends. A high pressure gas cushion 8 loads the oil in working cylinder 6 with pressure which tends to bias working piston 5 outwardly, thus producing the spring forces of spring element 2. The spacing between axle 3 and body 1 is determined by the amount of oil contained in working cylinder 6, and can be varied by fluid feeding, that is, by draining oil from a feed pipe 9 which is connected with the storage tank 10. Alternatively, the oil supply in cylinder 6 can be increased by delivering motor from a pump 11, driven by an electric motor 14, and through a non-return valve 12, which latter blocks flow in the direction of the storage tank, and with a flow valve 13 closed.

A storage battery 18 represents a source of operating potential whose negative terminal is conductively connected with the vehicle body and is thus at ground potential. All of the electrical conductors in FIG. 1 are represented by broken lines. The conductors connected to ground terminate in vehicle body 1 with suitable connection means.

A regulating switch 15 is secured on body 1 and is rigid with a lever 16 which is connected to axle 3 through a link 17. Switch 15 has a grounded contact surface 19 and a contact surface 20 connected with the positive terminal of battery 18. Between contact surfaces 19, 20, there is an insulated or dielectric zone 21. One end 24 of movable arm 23 of switch 15, and which is actuated by lever 16, is illustrated, in FIG. 1, as engaged with dielectric neutral zone 21. This end 24 of contact arm 23 will engage contact surface 20 when lever 16 is rotated clockwise and, if lever 16 is rotated counterclockwise, end 24 will engage contact surface 19. The other end 25 of arm 23 is connected, through charging resistance 28, with one plate 29 of a condenser 30 whose other plate 31 is grounded.

A line or conductor 32 is branched off between charging resistance 28 and condenser 30, and applies the condenser voltage to a control amplifier unit 33 which comprises tow control amplifiers 34 and 44 of known design, and whose details are therefore not illustrated specifically. The action of control amplifiers 34 and 44 consists in actuating respective switches 35 and 45 which are open in the illustrated position of the parts, and which, when closed, connect the associated lines 36 and 46 to the positive terminal of battery 18, which may be a 12 volt battery, for example. When the line 36 connected to electric motor 14 is connected to the positive terminal of battery 18 by closure of switch 35, motor 14 runs and, when switch 35 is open, motor 14 comes to a stop. When the line 46 connected to a lifting magnet 37 for actuating flow valve 13 is connected to the positive terminal of battery 18 by closure of switch 45, magnet 37 moves valve 13 into the flow position and, when switch 45 is opened, a coil spring 38 moves valve 13 back into the illustrated flow blocking position.

Control amplifier 34 closes switch 35 at condenser voltages which are between zero and the lower limiting voltage of 2 volts, for example, and opens switch 35 at condenser voltages above the lower limiting voltage. Control amplifier 44 closes switch 45 at condenser voltages above the upper limiting voltage of 10 volts, for example, and opens switch 45 at condenser voltages below the upper limiting voltage.

In the illustrated position of lever 16, which corresponds to the level of the chassis being kept constant by the regulating device, movable arm 23 is engaged with the neutral dielectric zone 21. Arm 23 alternately moves over contact surfaces 19 and 20 during dynamic vibrating movements of axle 3. An integrated voltage is thus produced in condenser 30, and this voltage is between zero and 12 volts, for example, 8 volts, and the integrated voltage does not attain either the lower or the upper limiting values, such as 2 volts and 10 volts, for example. Consequently, both control amplifiers 34 and 44 remain deactivated, and no control signal is given by regulating switch 15.

A variation of the load carried by spring element 2 causes a different equilibrium position of lever 16. If the vehicle load has increased, lever 16 has turned counterclockwise and arm 23 is, in the static equilibrium exclusively and during dynamic vibrations predominantly, in the range of grounded contact surface 19.

In both cases, condenser 30 is discharged. As soon as the condenser voltage decreases, with delay, below the lower limiting voltage, which is assumed to be 2 volts, and after a period of five seconds, for example, control amplifier 34 closes switch 35 to energize motor 14, whereupon pump 11 delivers fluid through feed pipe 9 into spring element 2. Chassis 1 is lifted relative to axle 3, and lever 16 again arrives in the represented position in which the increasing condenser voltage deactivates control amplifier 34, according to the represented position, when the lower limiting voltage is exceeded. Line 36 becomes disconnected from the battery and motor 14 and pump 11 come to a halt so that oil feeding is completed.

If the vehicle load has decreased, the regulating process takes place in the opposite sense. Thus, lever 16 is turned clockwise and arm 23 is either exclusively or predominantly in the range of contact surface 20 connected to the positive pole of battery 18 which is, for example, at 12 volts. The condenser voltage exceeds the upper limiting voltage of 10 volts, and control amplifier 44 is activated so that switch 45 is closed and magnet 37 moves valve 13 into the flow position. The oil is thus drained from spring element 2 and chassis 1 is lowered relative to axle 3. Lever 16 arrives again in the represented position, the condenser voltage drops below the upper limiting voltage, control amplifier 44 is deactivated, line 46 is disconnected from the battery by opening of switch 45, valve 13 returns to the flow blocking position and the draining of the oil is completed.

If changes in the represented neutral position of lever 16 are caused by thermal expansion of the oil spring element 2, oil leakage, or other reasons, regulation takes place in the same manner, a stable regulation being attained by corresponding adaptation of the delay periods, of the pumping capacity of pump 11, and a proper selection of the flow cross section of valve 13.

Figure 2:
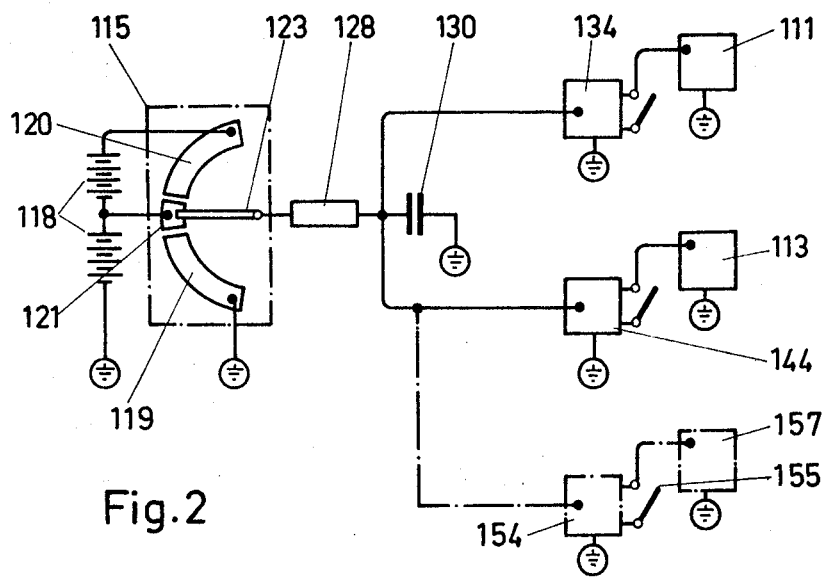
FIG. 2 is a schematic wiring diagram of a regulating device embodying the invention and in which the movable switch arm, in the neutral zone, is connected to one half the operating voltage.

In the embodiment of the invention illustrated in FIG. 2, regulating switch 115 has three contact surfaces 119, 120 and 212 and has a movable arm 123 which is actuated, for example, by a lever and the vehicle axle in the same manner as described for FIG. 1. Contact surfaces 119 and 120 are connected, respectively, to ground and to the positive terminal of operating current source 118, and act in combination with charging resistance means 128, condenser 130, control amplifiers 134 and 144, a fluid supply device 111 of any known type and a fluid draining device 113, also of any known type, in the same way as the corresponding parts of the arrangement shown in FIG. 1. In the position of the parts illustrated in FIG. 2, movable arm 123 is engaged with contact surface 121 which is connected to a medium voltage terminal of storage battery 118 with the effect that condenser 130 has applied thereto a medium voltage as long as the illustrated position of arm 123 is maintained either statically or dynamically.

The circuit illustrated in FIG 2 can be expanded by a control amplifier 154, shown in broken lines, which has reversing points at medium voltages, for example, at 5 volts and 7 volts, in such a manner that switch 155 actuated by control amplifier 154 is closed at voltages between 5 volts and 7 volts and is opened at other voltages. Switch 155 actuates a regulating device 157 associated with the regulating means.

Such an expanded circuit can be used for regulating the level, in connection with a piston pump 260 as shown in FIGS. 3 and 4. This pump acts at the same time as a draining device, which runs selectively, depending on the control signal, or halts in a certain position, the execution of the control signals being effected under the control of amplifiers 234, 244 and 254 which correspond to the control amplifiers 134, 144 and 154 of FIG. 2.

Piston pump 260 comprises essentially casing 261, crank shaft 262, connecting rod 263, piston 264, cylinder 265, inlet valve 266 and outlet valve 267. Crank shaft 262 is coupled, by means of a clutch disc 275, with a DC motor 268 having a grounded terminal. During the downward stroke of piston 264, cylinder 265 is filled, through inlet valve 266, from a reservoir 210. In the inner dead center position of piston 264, another connection between cylinder 265 and reservoir 210 is established through a control port 269 which is then exposed by piston 264, as shown in FIG. 4. During the upward stroke of piston 264, oil is forced from cylinder 265 through outlet valve 267 into an outlet valve chamber 270, from which there extends a feed pipe 272 to which are connected spring elements, such as the spring element 2 of FIG. 1. Between outlet valve chamber 270 and cylinder 265, there is an open connection provided by a preferably greatly restricted orifice 271. Clutch disc 275 carries interconnected concentric slip rings 276, 277 and 278. Outer slip ring 276 can be connected, by control amplifier 254 and a brush 280, to the positive terminal 218 of the source of operating potential. Central slip ring 277 can be connected by control amplifier 244 and brush 281 with this positive terminal. The outer slip ring 276 and the central slip ring 277 are interrupted at respective portions of their circumferential extent. The inner slip ring 278, which is not so interrupted, is connected, through a slip ring 282, to the ungrounded terminal 279 of motor 268.

Outer slip ring 276 has, in a manner not shown but which is known from windshield wiper motors, an interrupted dielectric angular zone on its circumference and which corresponds, in its position relative to brush 280, to the angular zone of the outer dead center position of pump piston 264 as represented in FIG. 3. In the same manner, central slip ring 277 has a dielectric angular zone which corresponds, in its position relative to brush 281, through the angular zone of the inner dead center position of pump piston 264, as represented in FIG. 4, and in which control port 269 is exposed. Control amplifier 234 permits connection of the ungrounded terminal 279 of DC motor 268 with the positive terminal of the operating potential and in bypassing relation with clutch disc 275.

To execute the various control signals, one of the control amplifiers 234, 244 or 254 is closed, as shown in FIG. 3. When brush 280 is in the interrupted angular zone of slip ring 276, motor 268 is not supplied with current and thus stops, halting pump piston 264 in the outer dead center position as shown in FIG. 3. In case brush 280 is in the uninterrupted angular zone of slip ring 267, contrary to the illustration in FIG. 3, motor 268 is supplied with current through control amplifier 254, brush 280, ring 276, ring 278, brush 282, and ungrounded terminal 279 until such time as clutch disc 275 is again rotated to the point where a brush is in an interrupted angular zone, whereupon the current supply is interrupted, suitable brake means being provided to prevent overrunning of the motor beyond the interrupted zone of slip ring 276 due to inertia of the motor armature. In the neutral zone, pump piston 264 is either in or close to the outer dead center position, and there is no connection between feed pipe 272 and oil reservoir 210.

During the control signal "feed oil," control amplifier 234 is activated and motor 268 is connected to the source of potential. Pump 260, driven by motor 268, is operated and piston 264 draws in oil from reservoir 210 and delivers it to feed pipe 272.

During the control signal "drain oil", control amplifier 244 is activated and brush 281 cooperates with slip ring 277, in the manner described in connection activated control amplifier 234, in such a manner that pump piston 264 now remains in or near the inner dead center position shown in FIG. 4. Oil can now drain off into reservoir 210 through the illustrated connection, the oil flowing from feed pipe 272 through restricted orifice 271 and control port 269 which is now uncovered by piston 264.

The restricted opening 271 through which oil flows back into the cylinder 265 during the intake stroke, has such a small cross section that piston 264 delivers more oil, during normal operation, than can flow back through orifice 271. If the pressure in feed pipe 272 becomes very high, more oil will always flow back during the intake stroke so that, with suitable selection of the dimensions of orifice 271, a limitation of the oil pressure, and thus prevention of overloading of the vehicle suspension, is possible when the delivery of oil into feed pipe 272 is interrupted with the pump still operating.

In the circuit shown in FIGS. 3 and 4, control amplifier 254 can be omitted if control amplifier 234 actuates, at the same time, a device known in windshield wiper motors and which has the effect that crank shaft 262 assumes, with control amplifier 234 deactivated, the position corresponding to the outer dead center position of piston 264.

In the embodiment of the invention shown in FIG. 5, the charging resistances associated with condenser 330, and acting in the various positions of regulating switch 315, with these resistances being connected between the positive terminal 301 and the grounded terminal 302 of the potential source, are of different design. Between movable arm 323 of switch 315 and condenser 330 there is connected a common charging resistance 328. The neutral zone contact surface 321 of switch 315 has applied thereto the voltage at the junction point between voltage divider resistances 303 and 304 connected between potential source terminals 301 and 302, this voltage being applied through an additional charging resistance 305. Contact surface 319 of switch 315 is connected to grounded terminal 302 through an additional charging resistance 306, and contact surface 320 of switch 315 is connected to positive terminal 301 through an additional charging resistance 307.

A Schmitt trigger is used as a high ohmic control amplifier for the feeding of fluid, and this Schmitt trigger 334 consists of two transistors 337 and 338, resistances 339, 340, 341 and 342, and relay 335. At condenser voltages below the lower limiting voltage, transistor 337 is blocked and transistor 338 is conductive, so that relay 335 is energized to emit the control signal "feed fluid". At condenser voltages above the lower limiting voltage, transistor 337 is conductive and transistor 338 is blocked, so that relay 335 is deenergized to cancel the control signal "feed fluid".

A second Schmitt trigger 434 serves as a control amplifier for fluid draining, and consists of two transistors 437 and 438, charging resistances 439, 440, 441 and 442, and relay 435. Through the medium of the series connected Zener diode 436, the input voltage of Schmitt trigger 434 is lower than the voltage of condenser 330 by the voltage across Zener diode 436. At condenser voltages above the upper limiting voltage, transistor 437 is conductive and transistor 438 is blocked, so that relay 435 is deenergized and emits the control signal "drain fuel". At condenser voltages below the upper limiting voltage, transistor 437 is blocked and transistor 438 is conductive so that relay 435 is energized to cancel the control signal "drain fluid."

If the vehicle axle is regulated to "level" within a few seconds after a change in the vehicle load, additional regulating action may occur, in many cases, with longer delay periods to save, at the same time, pump energy. Longer delay periods can be attained by the arrangement of exchangeable or variable charging resistances, or by reducing the positive potential applied to the regulating switch, for example, by voltage division of the potential of the operating source.

What we claim is:

1. In an electronic regulating device for fluid-type suspensions for motor vehicles and the like, whose level is maintained substantially constant by the regulating device through the medium of a movable arm, of a regulating switch, actuated in accordance with the distance between the vehicle body and the vehicle axle, the switch being connected to a grounded source of DC potential and the arm having an "up" regulating range providing the control signal "feed fluid," a neutral control range and a "down" regulating range providing the control signal "drain fluid", the control signals initiating, with a time delay provided by condensers and associated charging resistances, the actuation of control amplifiers which connect one or the other known means, executing the respective control signals, with the potential source: the improvement comprising, in combination, a condenser having one terminal connected to the grounded terminal of said source; said switch including an "up" regulating contact surface which is grounded, a "down" regulating contact surface connected to the ungrounded terminal of said source, and a "neutral" control range between said "up" and "down" contact surfaces; charging resistance means connecting the other terminal of said condenser to said switch arm; and first and second control amplifiers connected to said condenser, one operable to initiate feeding of fluid and the other operable to initiate draining of fluid; one control amplifier being activated by condenser voltages below a lower limiting voltage close to ground potential of said source, and the other control amplifier being activated by condenser voltages above an upper limiting voltage close to the ungrounded potential of said source; both control amplifiers being deactivated at condenser voltages between said upper and lower limiting voltages.

2. The improvement claimed in claim 1, in which said "neutral" control range is a dielectric contact surface.

3. The improvement claimed in claim 1, in which said lower limiting voltage determines feeding of fluid and said upper limiting voltage determines draining of fluid.

4. The improvement claimed in claim 1, in which said upper limiting voltage determines feeding of fluid and said lower limiting voltage determines draining of fluid.

5. The improvement claimed in claim 1, in which said neutral control range is a conductive contact surface; and means applying, to said neutral contact surface, a voltage which is intermediate the voltages of the grounded and ungrounded terminals of said source.

6. The improvement claimed in claim 5, including a third control amplifier connected to said condenser and providing an additional control signal when said movable switch arm is in contact with said "neutral" contact surface.

7. The improvement claimed in claim 1, in which said means executing the respective control signals comprises a single piston pump connected to a DC motor; said pump including a crank shaft, and a piston connected to said crank shaft and operable in a cylinder connected to a source of fluid and to said fluid-type suspension, said piston having inner and outer dead center positions and an intermediate position; said cylinder having a drain port which is covered by said piston in the intermediate position of said piston and which is exposed by said piston in the inner dead center position of said piston to drain fluid; said motor operating said piston responsive to the control signal "feed fluid" to force fluid from said cylinder to said fluid-type suspension and toward the outer dead center position of said piston; said motor operating said pump responsive to the control signal "drain fluid" to the inner dead center position of said piston to expose said port; said piston closing said port in its intermediate position and blocking said port from connection to said fluid-type suspension in its outer dead center position.

8. The improvement claimed in claim 1, in which said control amplifiers comprise Schmitt triggers.

9. The improvement claimed in claim 1, in which said charging resistance means comprises respective charging resistances each connected to a respective one of said contact surfaces.

10. The improvement claimed in claim 1, in which only the control signal "feed fluid" is executed; and a restricted opening constantly draining fluid from said fluid-type suspension.

11. The improvement claimed in claim 1, in which only the control signal "drain fluid" is executed; and means constantly feeding fluid to said fluid-type suspension.

12. The improvement claimed in claim 1, in which said regulating device is connected to said source only during periods when the vehicle is at its standstill.

13. The improvement claimed in claim 1, in which said regulating device is connected to said source only when the vehicle is in operation.

14. The improvement claimed in claim 1, in which said regulating device is connected to said source only at intermittent intervals.

15. The improvement claimed in claim 1, including means selectively operable to change the delay periods of the regulating action.